Sept. 28, 1926. 1,601,228
R. T. WALES
ACID PROOF TANK
Original Filed July 19, 1916    2 Sheets-Sheet 2
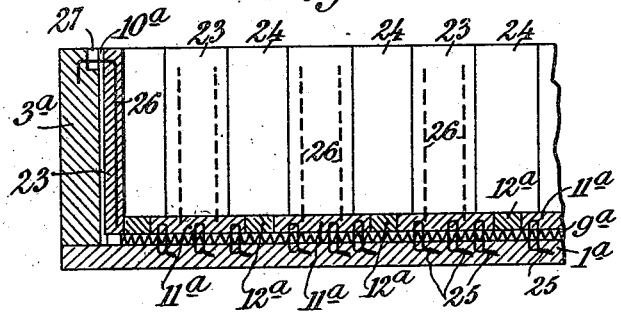
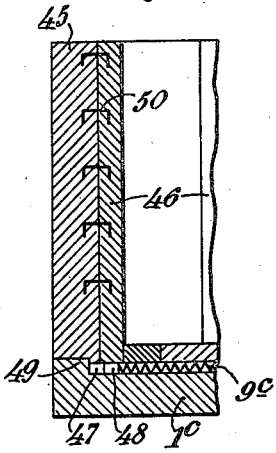
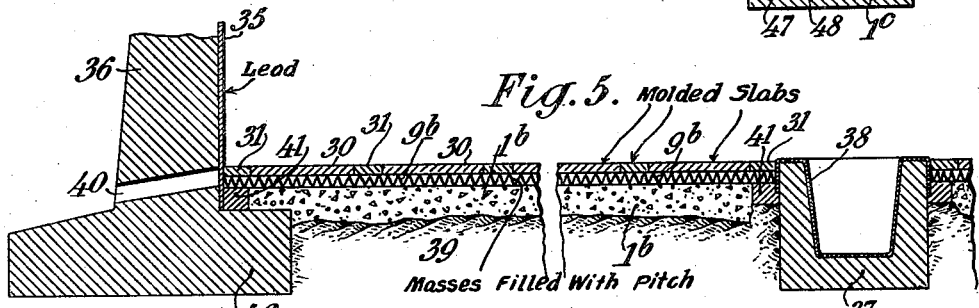
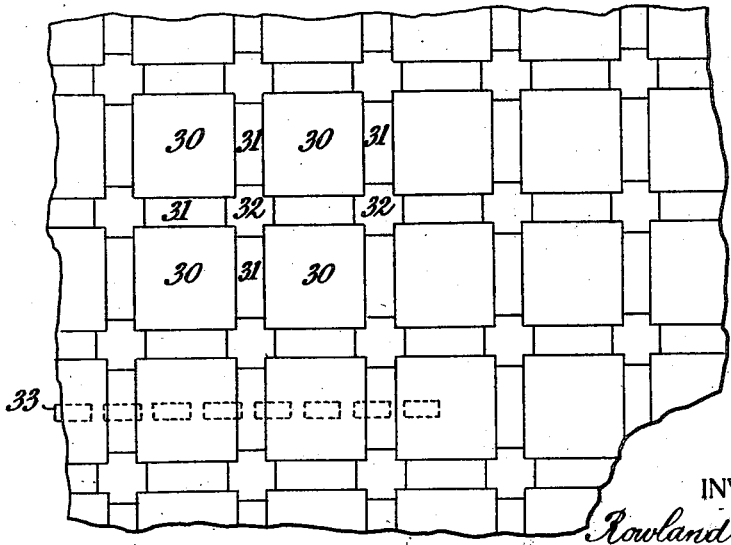
INVENTOR
Rowland T. Wales,
By Attorneys, Patented Sept. 28, 1926.

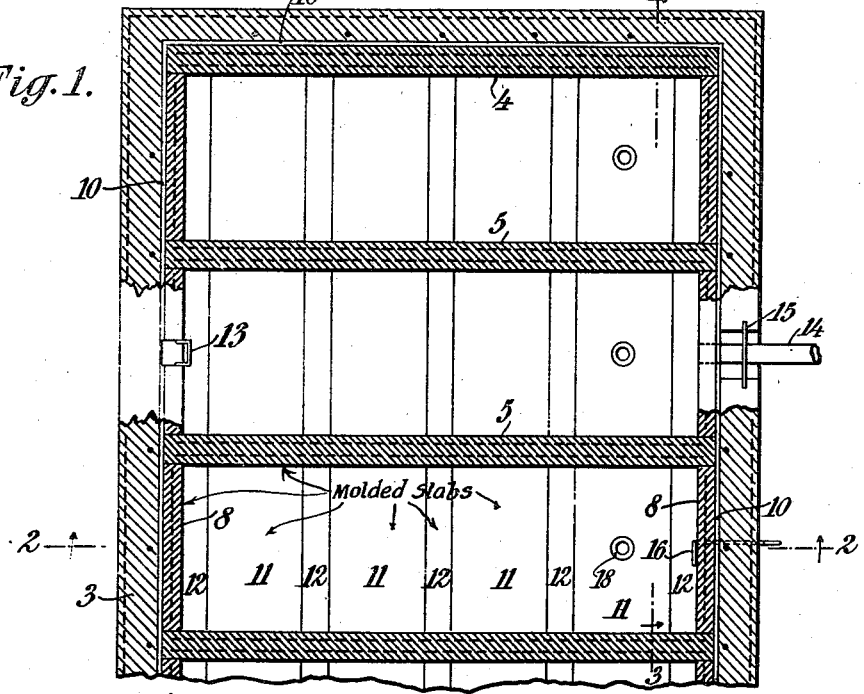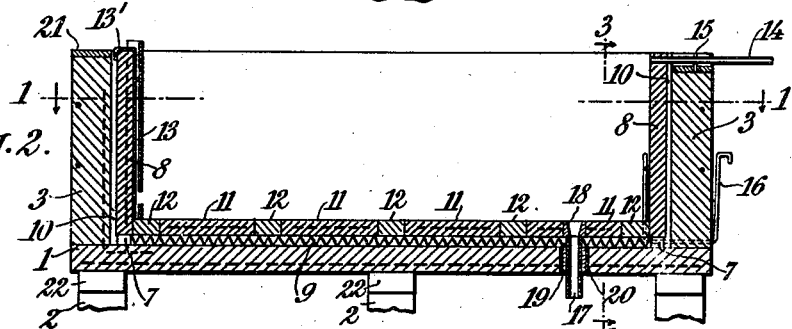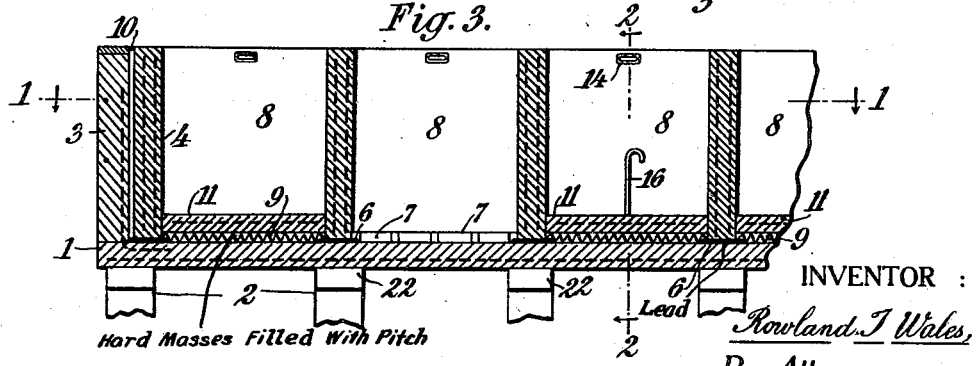

1,601,228

UNITED STATES PATENT OFFICE.

ROWLAND T. WALES, OF NEW ROCHELLE, NEW YORK.

ACID-PROOF TANK.

Original application filed July 19, 1916, Serial No. 110,050. Divided and this application filed October 14, 1922. Serial No. 594,593.

The object of the present invention is to provide a tank having a lining of hard, rigid, strong and acid-proof material molded directly in its final position in the tank, which is applied in a plastic semi-fluid or fluid condition and contracts while cooling, becoming hard. The invention also makes provision for filling the spaces normally created by the contraction of such material as it solidifies and when it is hard.

These improvements make it possible to line a tank with a hard, rigid and strong material that will not flow at the highest temperatures present in tanks used for electrolytic refining, leaching some ores and other metallurgical and chemical operations. Without these improvements it is impossible to line a tank successfully with a hard, rigid material which is plastic or fluid when hot, because on solidifying, cooling and contracting, leaks would result. If molded in a continuous mass, such material will badly crack on solidifying, cooling and contracting. If such material be applied as a cement or plaster, minute cracks will appear distributed almost uniformly throughout it on solidifying and cooling. When it has been attempted to apply such a material without my method, the defects outlined above have invariably resulted. In applying it as a plaster, it has also been found impossible to build it up to a substantial or uniform depth, because it has been necessary to heat the surface of one coat to enable it to take a subsequent coat. Therefore the first is softened and thereafter damaged when the subsequent coat is being applied. According to my invention, the inner part of the lining of the tank is molded in separate slabs, preferably in certain consecutive order and in certain manner, as will be described hereinafter. Various contributing features of the invention are referred to in the main descriptive portion and embodied in the claims.

The drawings accompanying this specification are illustrative of my improved tank lining and the method of constructing the same, in which drawings,—

Figure 1 is a horizontal section taken on the plane indicated by the lines 1—1 in Figs. 2 and 3, the tank illustrated having a series of compartments or cells and adapted for the electrolytic refining of copper and similar uses.

Fig. 2 is a vertical section taken on the plane indicated by the lines 2—2 in Figs. 1 and 3.

Fig. 3 is a vertical section taken on the lines 3—3 in Figs 1 and 2.

Fig. 4 is a vertical section illustrating a tank with sides each too long for a single slab and therefore lined with a plurality of upright slabs.

Fig. 5 is a vertical section illustrating a very deep and wide tank in which the bottom is lined according to my present invention. It also illustrates a sealing of the sheet metal side lining by means of my improved bottom lining and the supporting base.

Fig. 6 is a plan view of a part of a bottom lining illustrative of this invention, and Fig. 7 is a vertical section showing the outer tank wall molded directly on the previously molded slab lining. This construction is suitable for uses wherein the expansion and contraction during subsequent service is negligible, due to a substantially uniform temperature which exists in special tanks for some purposes.

The tank illustrated in Figs. 1, 2 and 3 is shown having a base or supporting slab 1 illustrated as being preferably formed of reinforced concrete and mounted upon suitable piers. The tank is also provided with an outer wall 3 also illustrated as being of reinforced concrete. In Fig. 3 the lining is removed from the bottom of one of the cells to show the bricks 7.

The tank is shown provided with an end lining 4 and a series of transverse partitions 5 which are reinforced monolith slabs molded of the hard acid-proof material above referred to. The bottom of each of these slabs rests upon a plate of sheet lead 6 sufficiently wide and long for its edges to extend beyond the sides and ends of the slab. There is next laid a row 7 of bricks spaced apart in position to support the lining slab 8 at each place where such slab is to be molded. The bottom of the tank is then covered with a layer 9 of hard masses of coarse material such as crushed rock or slag filled with coal tar pitch or pitchy material filling the voids nearly to the level of the tops of the said masses. In putting down this layer, the crushed material from which the fine portions have been screened, is placed in position, and melted coal tar pitch or pitchy material is poured into the layer and fills the voids, as above described, and also runs into the spaces between the bricks forming the rows 7. The hard masses are coarse enough to remain stationary while the pitchy material intermingled with them is adapted to move or flow between them when said pitchy material expands, contracts, or is subjected to greater pressure from one direction than from another. In some constructions it may be found desirable to employ a row of block 7 in place of a lead plate 6. Any leak downward through a slab 5 is prevented, by the lead plate, from reaching the base 1, because the top of the corresponding edges of the lead plate is securely embedded in the pitchy material. It will be understood that the rows of blocks 7 with their surrounding pitchy material are essentially alike, the regular form of the blocks 7 being preferable at the side walls where the side wall lining slabs are to be moulded; but the precise shape of the blocks, masses or other bodies of hard material being unessential, and either form being the equivalent of the other.

In the form of tank illustrated in Figs. 1 to 4 inclusive a space for receiving pitchy material is left at 10 or 10ᵃ between the linings and partitions and the outer wall 3 or 3ᵃ.

A suitable reinforcement for the slabs is a panel formed of round rods, some of which extend transversely to others to which they are welded. I have used to advantage such rods without welding but it is better to use what is commonly known as "welded wire cloth", in which the rods are about five-sixteenth inch gage. In Figs. 1, 2 and 3, dash lines within the lining slabs indicate panels of reinforcement.

After the slabs 4 and 5 have hardened and contracted and after the pitch in layer 9 is cooled and stiff, the lining slabs 8 and 11 are molded in position and permitted to harden and contract. Then the slabs 12 are molded, the slabs 12 being of such small width that the contraction in setting is practically negligible. Each of the various slabs is molded directly in its final positon in the construction. The slabs, except those marked 4 and 5 are successively molded against upright faces of previously molded slabs after such previously molded slabs have set and contracted. The space yielded by the contraction of the previously molded slabs is thus substantially filled up and the adjoining faces of slabs conform substantially with each other.

In Fig. 1, at the ends of one cell, small areas of the top are shown in unbroken plan to show the parts referred to in the following.

In the tank illustrated in Figs. 1, 2 and 3 an inlet pipe is shown at 13 and an outflow pipe is shown at 14. A dam 15 in the form of a piece of sheet lead is secured to the outflow pipe 14. With the various parts in the positions above described, the space 10 is cleaned out in some suitable manner and then filled with melted coal tar pitch which commingles with the coal tar pitch in the layer 9 and forms a suitable seal in back of the various upright slabs of hard acid-proof material. The plate 15 forms a dam for preventing the outflow of the pitch through the space surrounding the pipe 14.

In certain work it may be found desirable to employ a different type of outflow from that above described, a suitable type for some work being illustrated at 16.

Each compartment or cell of the tank is shown provided at its bottom with an outlet pipe 17 connected with a plug seat 18 which is placed in position and the lining slab 11 molded around it. It is preferable to have pipe 17 where it passes through the slab 1 of concrete, surrounded by a filling 19 of the acid-proof and insulating cement. In forming the slab 1, suitable permanent forms 20 will be preferably placed where it is desired to have these outlets. The space between this form and pipe 17 is subsequently filled with an insulating cement.

The top of the side wall 3 is shown covered with slabs 21 of the hard acid-proof cement. As a convenient means for holding the inlet pipe 13 in position it may be provided with a strap 13' of sheet lead passing over the top of the lining slab and bent down into the the space 10, the bent over end extending below the surface of the pitchy material filling the space 10.

It will be found of advantage in electrolytic work to mold caps 22 of the insulating acid-proof cement on the tops of the piers 2, so as to form insulation between the ground and the slab 1.

In the construction shown in Fig. 4 on the base slab 1ᵃ is shown a layer 9ᵃ of coarse masses and pitchy material, upon which is molded slabs 11ᵃ and 12ᵃ. The tank is also shown provided with reinforced slabs 23 alternating with slabs 24. In forming this tank the concrete base slab 1ᵃ is molded, and while it is plastic a series of upwardly projecting tie wires 25 are placed in position. The bricks near the sides and the layer 9ᵃ are then placed in position and the layer 9ª surrounds and seals the wires, permitting sufficient amount to extend to be embedded in the first laid series of slabs 11ª. This is for tying down the bottom lining of the tank so that it will not be pressed up by the hydrostatic force of the coal tar pitch in the space 10ª, particularly when a hot solution is quickly removed from the tank. It is not generally necessary to tie down the narrow intermediate slabs 12ª.

During the molding of the side walls 3ª, or before these are sufficiently set, reinforcing and tie rods 26 have their ends embedded in such wall 3ª and extend perpendicularly to such wall and have a long portion dropping almost to the position which will be occupied by the bottom of the slabs 23. It is preferable to provide two of these reinforcing and tie rods for each of such slabs, and have them located a sufficient distance inwardly of the side edges of the slabs to be properly embedded. At the point where each of these rods 26 extend from the side wall, the latter may be provided with an enlargement 27 of the space 10ª which receives a body of the pitchy material. In molding the lining slabs the slabs 23 are molded in their final position and about the rods 26, and after the slabs 23 have hardened and contracted the slabs 24 are then molded in position against the slabs 23. By means of the pocket 27 a longer span is given to the horizontal portion of the tie rod. This permits a sufficient amount of flexibility during the contraction of the slab.

In Figure 6 there is illustrated a bottom lining for the tank made according to the illustrative example. A series of slabs 30 is laid, each of these slabs being of suitable proportions for conveniently working and large enough for economy in the operation. The slabs 30 are spaced apart, and after they have set and contracted part of the space between adjacent slabs is filled by molding against the edges of the slabs 30 narrow slabs 31, the width of these latter slabs being such that the shrinkage in setting is practically negligible. A certain amount of shrinkage takes place longitudinally of the slabs 31. After the slabs 31 have set, corner fillers 32 are molded in position against the ends of the slabs 31 and the corners of the slabs 30. The dimensions of the fillers 32 are such that the shrinkage of these in any direction is practically negligible.

It is found of advantage at times to place in the backing under the slabs of hard acid-proof material, that is, for instance, in the layer illustrated at 9ᵇ in Fig. 5, a row of blocks. For instance, hard brick 33 (see Fig. 6) are disposed at points where the weight of the material under treatment will be concentrated. Such points are generally under the sill timbers of a false floor upon which the material treated is placed.

The form of tank construction illustrated in Fig. 5 is particularly adapted for use in very large and deep tanks in which it is impractical to line the upright walls with hard slabs and backing of coal tar pitch. In such a case a sheet lead lining 35 is then placed against the concrete side wall 36. In the drawing there is also shown a sump or gutter 37 at the bottom of the tank. This is formed of concrete lined with sheet lead 38. In certain installations it is found feasible to build a tank directly upon the earth illustrated at 39. The side walls 36 in this instance are with advantage provided with an enlarged concrete base or foundation 42. In this form of tank the layer of coarse material and pitch substance similar to that previously described is illustrated at 9ᵇ and over this is laid a bottom lining substantially similar to that shown in Fig. 6. The inner face of the side wall 36 is shown extending below the level of the layer 9ᵇ, which layer preferably rests on a slab 1ᵇ of concrete. The base 42 is shown extending inwardly under the margin of the bottom lining, and upon it rests the concrete slab 1ᵇ.

In constructing the tank above described and illustrated in Fig. 5, the side walls are first built and the concrete slab 1ᵇ molded in shape. There is, however, left around the edge of this concrete 1ᵇ, a border space into which the lower edge of the sheet lead lining 35 extends, and there is also left adjacent the gutter or sump 37, (which may be laid at the same time as the other concrete work), a similar border space in which the overturned edge of the lead lining 38 is extended. After the above various concrete parts have set and the sheet lead is placed in position, the border spaces are filled with concrete 41. Then the layer 9ᵇ is formed by placing in the crushed rock or other hard masses and flowing in the pitchy material which engages the sides of the sheet lead lining above the lower edge thereof and above the border space fillers 41. The slabs of the lining proper are then molded in position, those slabs at the edges of the lining being in direct surface engagement with the sheet lead lining. The object of forming the border space fillers 41 is to facilitate repairs in case some accident happens to the lead lining, or in case it was defective when placed in position. To make such repairs it is quite a simple matter to remove the narrow slabs 31, the underlying portion of the layer 9ᵇ and the border space fillers 41, and effect the repair and replace the removed portions of the lining without great inconvenience or expense.

Sheet lead frequently develops leaks or becomes punctured and if this should occur, fluid contents of the tank, as, for instance, the acid baths, would lodge against the concrete wall 36. Corrosion of the concrete would ensue, and this being in a concealed position, the tank would be seriously damaged before the presence of a leak is known. To avoid this and to indicate to the attendants the presence of such leaks at their commencement, a series of ducts 40 running through the side walls 36 are provided. It is thus obvious that when the solution leaks through the lead lining, it will pass through the nearest duct 40 and thus indicate not only the fact that there is a leak, but approximately its position.

In the construction shown in Fig. 7 the side wall 45 is molded directly against the previously molded lining slabs 46, and upon pitchy material 47, which connects between the row of bricks 48 with pitchy material in the layer 9ᶜ. The bottom slab 1ᶜ for this tank is shown provided with an upwardly extending flange, as it were, 49, for retaining the pitchy material. Tie rods 50 are shown embedded in the lining slabs 46 and the outer wall 45. Instead of providing the body of pitchy material 47 and the row of bricks 48, sheet lead such as is illustrated in Fig. 3 could be placed upon the bottom or supporting slab 1ᶜ, and upon this the lining slabs 46 would then be molded directly, in which case the pitchy material would be held in place, and there would then be no need of the upward extension or flange 49.

It is preferable to mold the slabs of hard acid-proof material with forms of sheet metal. Wood is objectionable for forms because they become heated and the escaping gases and moisture make blow holes and a rough surface. The wood also becomes warped by the heat.

It will be understood that the constructions herein are illustrative examples of my invention, and that changes may be made within the scope and spirit of the invention as the exigencies of various installations demand.

The present application is a division of my application Serial No. 110,050, filed July 19, 1916.

What I claim is:—

1. A tank comprising a bottom support, a layer of hard masses on said support, having intervening interstices, pliable or pitchy material filling such interstices to a substantial depth of the said masses, and slabs of hard acid-proof material molded in position on the upper surface of said layer.

2. A tank comprising a bottom support, upwardly projecting tie wires molded therein, a layer comprising pliable or pitchy material and hard masses disposed on said support and slabs of hard acid-proof material superposed on the upper surface of said layer, the upper ends of the said tie wires extending into and embedded in said slabs.

3. A tank comprising a bottom support, a layer of hard masses and pliable or pitchy material on said support, and slabs of hard acid-proof material superposed on said layer, said slabs comprising large slabs molded in spaced relation and separated one from another, and smaller slabs subsequently molded in and filling the spaces between such larger slabs.

4. A tank comprising a bottom support and side walls, a bottom lining of hard and acid-proof material resting above the bottom support, and side linings comprising upright slabs of said material extending below the level of the upper surface of the bottom lining, and a bottom seal of pliable or pitchy material.

5. A tank comprising bottom and side walls, an inner upright lining for the side walls embodying a series of separated slabs of hard and acid-proof material comprising relatively large slabs molded in spaced relation, and smaller slabs subsequently molded in and filling the spaces between said large slabs, and pliable or pitchy material disposed between the bottoms of the said slabs and the bottom of the tank.

6. A tank comprising a partition slab of hard, reinforced and acid-proof material, with the upright ends of said slab at short distances from the upright body walls of the tank and the space intervening between said ends and said walls filled with a pitchy material which is adapted to yield to expansion and contraction of said partition slab and to seal the joints between it and the adjoining slabs in the lining of the tank.

7. A tank having a bottom and side walls, a strip of sheet lead on said bottom, a partition slab of hard, reinforced and acid-proof material on said strip, with the upright ends of said slab at short distances from the upright body walls of the tank, and the space intervening between said ends and said walls filled with a pitchy material which is adapted to yield to expansion and contraction of said partition slab and to seal the joints between it and the adjoining slabs in the lining of the tank.

8. A tank construction in which is disposed on the base a layer comprising hard masses and pitchy material, a partition slab of hard, reinforced and acid-proof material, with the upright ends of said slab at short distances from the upright body walls of the tank and the space intervening between said ends and said walls filled with a pitchy material which is adapted to yield to expansion and contraction of said partition slab and to seal the joints between it and adjoining portions of the lining of the tank.

9. A tank having an upright side lining of sheet lead, the lower edge of said sheet lead being buried with a hard setting material such as concrete and upon which is placed a pitchy material forming a tight joint with said sheet lead at all points along the joint between said sheet lead and said hard setting material.

10. A tank comprising a bottom support and side walls, a bottom lining of hard and acid-proof material resting above the bottom support, and side linings comprising upright slabs of said materials extending from a level below the upper surface of the bottom lining to substantially the level of the top of said side walls, and a bottom seal of pliable or pitchy material In witness whereof, I have hereunto signed my name.

ROWLAND T. WALES.